(12) United States Patent
Mueller (10) Patent No.: US 11,174,832 B2
(45) Date of Patent: Nov. 16, 2021

(54) HYDRAULIC DEVICE USING GRAVITY AND BUOYANCY FORCES AND METHOD FOR OPERATING SUCH A DEVICE

(71) Applicant: Erwin Mueller, Bad Rappenau (DE)

(72) Inventor: Erwin Mueller, Bad Rappenau (DE)

(73) Assignee: Erwin Mueller, Bad Rappenau (DE)

( * ) Notice: Subject to any disclaimer, the term of this patent is extended or adjusted under 35 U.S.C. 154(b) by 0 days.

(21) Appl. No.: 16/628,545

(22) PCT Filed: Jul. 4, 2018

(86) PCT No.: PCT/EP2018/068104
§ 371 (c)(1),
(2) Date: Jan. 3, 2020

(87) PCT Pub. No.: WO2019/008043
PCT Pub. Date: Jan. 10, 2019

(65) Prior Publication Data
US 2020/0217295 A1 Jul. 9, 2020

(30) Foreign Application Priority Data
Jul. 6, 2017 (DE) ..................... 10 2017 115 123.0

(51) Int. Cl.
*F03B 17/04* (2006.01)
*F03B 17/00* (2006.01)
(Continued)

(52) U.S. Cl.
CPC ............ *F03B 17/04* (2013.01); *F03B 17/005* (2013.01); *F03B 17/025* (2013.01); *F03G 3/02* (2013.01)

(58) Field of Classification Search
CPC ........ F03B 17/005; F03B 17/02; F03B 17/04; F03B 17/025; F03G 3/02; F03G 3/08
(Continued)

(56) References Cited

U.S. PATENT DOCUMENTS

| 2,850,261 | A | * | 9/1958 | Rutkove | ................. F03B 17/02 416/84 |
| 3,412,482 | A | * | 11/1968 | Kusmer | ................. F03B 17/04 434/300 |
| 3,934,964 | A | * | 1/1976 | Diamond | ................ F03B 17/04 415/7 |

(Continued)

FOREIGN PATENT DOCUMENTS

| DE | 4329964 A1 | 2/1994 |
| DE | 29521296 U1 | 2/1997 |

(Continued)

OTHER PUBLICATIONS

Simanek, Donald. The Museum of Unworkable Devices. https://www.lockhaven.edu/~dsimanek/museum/unwork.htm; https://www.lockhaven.edu/~dsimanek/museum/themes/centgrav.htm; https://www.lockhaven.edu/~dsimanek/museum/themes/buoyant.htm (Year: 2016).*

(Continued)

*Primary Examiner* — Mark A Laurenzi
*Assistant Examiner* — Mickey H France
(74) *Attorney, Agent, or Firm* — Dickinson Wright PLLC (57) ABSTRACT

The invention relates to a hydraulic device that uses gravity and buoyancy forces, in which during a rotation of the assembly, movable masses (M1, . . . , Mn) are displaced by means of a force acting on the masses that counteracts the weight force in such a way that said masses contribute to the rotational movement.

11 Claims, 5 Drawing Sheets

(51) Int. Cl.
*F03B 17/02* (2006.01)
*F03G 3/02* (2006.01)

(58) Field of Classification Search
USPC .................................................. 60/495–507
See application file for complete search history.

(56) References Cited

U.S. PATENT DOCUMENTS

| | | | | |
|---|---|---|---|---|
| 5,372,474 | A  * | 12/1994 | Miller | F03B 17/005 |
| | | | | 415/1 |
| 6,764,275 | B1 * | 7/2004 | Carr | F03B 17/005 |
| | | | | 415/1 |
| 7,735,318 | B1 * | 6/2010 | Curiel | F03B 17/02 |
| | | | | 60/495 |
| 2010/0146961 | A1 * | 6/2010 | Silva | F03B 17/04 |
| | | | | 60/495 |

FOREIGN PATENT DOCUMENTS

| | | |
|---|---|---|
| DE | 202008007881 U1 | 10/2009 |
| DE | 102010006197 A1 | 8/2011 |
| DE | 202016106076 U1 | 11/2016 |
| FR | 2718194 A1 | 10/1995 |
| WO | 9637701 A1 | 11/1996 |

OTHER PUBLICATIONS

International Search Report dated Oct. 8, 2018, which issued in corresponding PCT Patent Application No. PCT/EP2018/068104.
German Examination Report dated Aug. 21, 2017, which issued in the corresponding German Patent Application No. 10 2017 115 123.0.

* cited by examiner

HYDRAULIC DEVICE USING GRAVITY AND BUOYANCY FORCES AND METHOD FOR OPERATING SUCH A DEVICE

The present invention relates to a hydraulic device, in particular a hydraulic device that uses gravity and buoyancy forces, according to claim 1, and to a method for operating such a hydraulic device.

PRIOR ART

Rotating systems and devices that are equipped with a flywheel and involve a clever arrangement of weights and the use of gravitational force with sophisticated kinematic behavior, which systems and devices are set in motion by the available momentum or directly by gravitational force, are already known in the prior art. However, as yet the drawing of a usable force or energy or work from this type of motion has not been adequately realized. In particular, in the solutions known in the prior art adverse friction losses occur, which in the case of purely mechanical systems in particular are caused by mechanical components such as bearings and the like.

From DE102010006197 A, a machine for storing and delivering energy by using weights rotating on a flywheel is known, in which increased torque can be generated using guided displaceable weights in conjunction with a geometric imbalance in one-half of a turning circle based on the path of the center of gravity of a turning circle. The shifting of the weights in the area of rotation that involves upward movement and against the force of gravity should be accomplished with minimal energy consumption as a result of shorter moment arms than in the analogous mirror-image angle of rotation, enabling surplus torque to be maintained in the system for a longer period of time. According to the invention, a stand supports the rotor, which acts as a guide device to guide the weights. The installation of a spring and a guideway enables the weight to reach the point of rotation early, placing the weight in the quadrant with the positive momenta even before 180 degrees have elapsed. The design of the main parts as modules and the provision of these modules in any desired number increases the capacity of the device substantially.

DE 4329964 A describes a rotor that supports balance rails radially opposite one another on a hub. At the free end thereof, weighted rods having a weight at one end are pivotably attached. The ends of the weighted rods are connected by a cable. During rotation, as the weighted rod turns over the weights on the ascending side move toward the hub. Thus, less torque is generated on this side than on the opposite, downward-moving side. This design is intended to generate surplus torque for rotational movement. However, with this solution the surplus torque is not sufficient to generate prolonged rotation.

A similar solution is known from document No. DE 295 21296 U. In this case, a radially displaceable weight is arranged on each of multiple vanes mounted on a shaft. On the ascending side, the weights are thrown in succession over a leading edge toward the center and beyond this to the other upper end of the vane. Here again, the surplus torque is insufficient to generate prolonged rotation.

It is therefore the object of the present invention to provide an improved device that utilizes the force of gravity and preferably also utilizes the force of buoyancy, with which overall improved efficiency can be achieved and any system-specific internal losses that occur are reduced, making more prolonged rotation possible. More particularly, it is the object of the present invention to reduce mechanical friction forces in the system and to make it possible for the hydraulic device to effect a cyclical intake of energy, which can be used as energy in particular via an output. To accomplish this, the sum of gravitational force and buoyancy is advantageously used such that the resulting torque is adjusted to achieve the aforementioned effect.

The basic concept of the present invention is therefore to provide a hydraulic device, in particular a gravity- and buoyancy-hydraulic device, that uses the forces of gravity and buoyancy acting on movably arranged masses, which are coupled to the gravity-hydraulic device, as a source of energy, wherein the potential energy stored by the masses is converted cyclically into hydraulic energy and vice versa and the relevant mass intermittently experiences a buoyancy force in a liquid. The cyclical energy conversion from potential energy to hydraulic energy and vice versa is realized, in particular, by using a rotating assembly on which parts of the hydraulic components are arranged along with the movable masses. In particular, the invention provides for the movable masses to be conveyed via weighted rods from a lower position of lower potential energy to an upper position of higher potential energy by means of a double-acting cylinder.

To accomplish this, the following two solutions are proposed:

Solution 1 (gravity-hydraulic device) and solution 2 (gravity- and buoyancy-hydraulic device).

According to the invention, in the first solution a gravity-hydraulic device having masses arranged movably with respect to the axis of rotation is provided, wherein the gravity-hydraulic device has an assembly mounted to rotate 360° around an axis of rotation, and has at least two casing pipes, which are mounted centered with respect to the center of rotation on the rotatably mounted assembly, each end of said casing pipes being connected to a hydraulic cylinder, wherein inside each of the casing pipes a weighted rod is mounted to move back and forth in the radial direction and is connected or coupled at each end to a cylinder piston of one of the hydraulic cylinders so as to enable movement. In a closed flow system, a hydraulic fluid is further provided, which is conveyed via connecting tubes of the flow system in each case from the hydraulic cylinder arranged at one end of a casing pipe to the hydraulic cylinder arranged at the other, opposite end of said casing pipe by actuating the hydraulic cylinders by the cylinder stroke by means of the gravitational force acting on the weighted rods. The radial displacement of the masses results in an effective torque that is used in the direction of rotation.

The solution can also be implemented in principle using one such casing pipe.

In a particularly advantageous embodiment of the invention, it is provided that the rotatably mounted assembly is mounted to rotate around a horizontally arranged or mounted shaft, and the radial movement of the weighted rods corresponds to the stroke length of the respectively connected hydraulic cylinders. In other words, the piston rod of the piston of the respective hydraulic cylinder is operatively coupled at its end to the weighted rod, so that a downward movement of the weighted rod as a result of gravitational force effects an actuation of the piston rod, and the hydraulic fluid in the hydraulic cylinder is conveyed from the hydraulic cylinder via an appropriately attached connecting line to one of the double-acting cylinder pistons, which will be described in the following.

It is further advantageously provided that each hydraulic cylinder arranged at one end of a casing pipe is fluidically connected to the hydraulic cylinder arranged at the other, opposite end of said casing pipe via a double-acting hydraulic cylinder as mentioned above, wherein the space between the one cylinder base of the double-acting hydraulic cylinder (cylinder chamber) and the one operative piston surface of the piston is fluidically connected to the one hydraulic cylinder, while the space between the second, opposite cylinder base of the double-acting hydraulic cylinder and the second operative piston surface is fluidically connected to the other hydraulic cylinder, specifically to the hydraulic cylinder mounted on the opposite end.

In a further advantageous embodiment of the invention, each of the lines connecting the hydraulic cylinders to the double-acting hydraulic cylinders can be opened and closed via shut-off valves, preferably shut-off valves provided directly on the upper and lower hydraulic cylinders, at a predetermined time, particularly in a specified or predetermined cycle. This is to guarantee that when the rotating assembly of the gravity hydraulic device rotates as intended, it can be ensured that the shut-off valves in each case can be opened and closed at a specific, defined point in time, that is to say with the entire device and thus the weighted rods in a specific position, so that the gravity hydraulic device will operate in accordance with the teaching of the invention.

According to the invention, therefore, a controller is provided which can actuate as intended, in particular can open or close, at least one shut-off valve or a group of shut-off valves of the hydraulic cylinders mounted on one side of the casing pipes, while at the same time or with a time delay, the controller can actuate, in particular can open or close, at least one shut-off valve or a group of shut-off valves of the hydraulic cylinders on the opposite side of the casing pipes, depending on the relative position and/or angular position and/or rotational speed of the rotatably mounted assembly.

It is further advantageously provided for the piston of the double-acting cylinder in each case to be coupled to one of the arranged masses, so that when the piston of the respective double-acting cylinder is actuated, the masses are simultaneously actuated from a lower position to an upper position. This produces a coupling between the masses and the double-acting hydraulic cylinders. Depending on the position and the timing, the masses are thus either in a lower position of lower potential energy or In an upper position of higher potential energy. At the same time, the piston rods of the double-acting cylinders are in either a lower position or an upper position.

In a further advantageous embodiment of the invention it is provided that the weighted rods are mounted movably in a liquid inside the casing pipes.

In a likewise advantageous embodiment of the invention, it is provided that the rotatable assembly as a whole is equipped with an output for connection of a system to be rotationally driven. Further, in particular via a transmission, the energy stored in the system of the gravity hydraulic device can be withdrawn from the system via an output and used.

According to the invention, in the second solution a gravity hydraulic device is provided, which, in addition to the aforementioned idea, also provides a pool that contains liquid, so that when the weighted rod is rotated, the masses of the gravity hydraulic device coupled thereto, around an axis of rotation by 360°, these weights are conveyed through the liquid and experience buoyancy. The resulting force and torque component is thus the sum of the gravitational force acting on the weighted rod with the masses coupled thereto and the buoyancy force, which exerts a force component counter to gravity when the mass attached to the weighted rod is immersed.

The remaining operating principle of the other components is similar to that of the first solution described above, which lacks the buoyancy component due to the absence of a liquid pool. In this solution, a single central weighted rod is mounted rotatably around an axis of rotation and in a vertical alignment can be moved up and down, from a lower position to an upper position and vice versa.

The weighted rod is connected at each end to a double-acting hydraulic cylinder, and the weighted rod itself is preferably mounted in a casing pipe. However, other methods of mounting are also possible.

The weighted rod is coupled to the double-acting cylinders in such a way that the cylinder chambers fill the one cylinder chamber or the other cylinder chamber with hydraulic fluid, depending on the relative position of the weights.

Since the two double-acting cylinders are hydraulically connected to one another, the following cycle can be implemented, as described below based on a counter-clockwise direction of rotation.

The positions are designated here as the 12 o'clock position, the 3 o'clock and 9 o'clock positions, and the 6 o'clock position.

At the start of rotation, the upper weight in the 12 o'clock position is in a maximum upper position, in which the weighted rod is in its lower position. The weight at the lower end of the weighted rod is still in the liquid in a basin (due in part to the buoyancy) but is also in its upper position.

The first chamber of the double-acting cylinder, to which the cylinder rod of the attached weight is coupled, is filled with hydraulic fluid, while the second chamber or chambers have been emptied by the weight of the weighted rod.

The situation at the top (in the 12 o'clock position) is exactly the opposite. The piston rod is extended fully from the first chamber of the cylinder, leaving it "empty" or not filed with hydraulic fluid.

The other chamber(s) are filled with hydraulic fluid.

When the upper, extended weight moves toward the 6 o'clock position, the lower weight simultaneously moves upward to the 12 o'clock position. The weight moving toward the 6 o'clock position reaches the basin filled with liquid at around the 7 o'clock position, where it experiences buoyancy. The two filled cylinders are emptied by the buoyancy and the movement of the piston rod. The force ratios can be coordinated and dimensioned appropriately for this purpose.

When the weighted rod arrives in the upper, 12 o'clock position it moves downward, emptying the previously filled first cylinder and filling the two cylinders coupled to the weight. This moves the weight upward.

The described cycle repeats with each additional 180° rotation.

Each of said weights is connected or coupled to a cylinder piston of one of the hydraulic cylinders in a manner that will effect movement. In a closed flow system, a hydraulic fluid is further provided, which conveys the hydraulic fluid via connecting tubes of the flow system from the one hydraulic cylinder to the other hydraulic cylinder at each end by actuating the hydraulic cylinders by the cylinder stroke by means of the gravitational force acting on the weighted rods. The radial displacement of the masses and the different torque ratios above and below result in an effective torque that is used in the direction of rotation.

A further aspect of the present invention relates to a method for implementing a rotating or rotatory system or machine using a gravity hydraulic device as described above according to the first solution, said method comprising the following steps:

a) Rotating the rotatable assembly clockwise or counter-clockwise around its horizontally mounted axis of rotation until the weighted rod(s) is/are oriented substantially vertically or until the orientation thereof corresponds to a pre-determined position and until the lower hydraulic cylinders are in a defined lower position and the upper hydraulic cylinders are in a defined upper position, the shut-off valves of the upper hydraulic cylinders being open and the shut-off valves of the lower hydraulic cylinders being closed;

b) Opening the shut-off valves of the lower hydraulic cylinders at a defined rotational position, wherein the hydraulic fluid in the lower pistons is conveyed into the lower piston chamber of the double-acting hydraulic cylinders by virtue of the gravitational force acting on the weighted rods, thereby actuating the respective piston of the respective double-acting hydraulic cylinder together with the mass coupled thereto from a lower position to an upper position, specifically by the stroke length of the respective double-acting hydraulic cylinder;

c) whereby the actuation of the piston simultaneously effects a conveyance of the hydraulic fluid via a connecting line from the upper piston chamber of the double-acting hydraulic cylinder into the upper hydraulic cylinder connected thereto.

In an advantageous embodiment of the method according to the invention it is provided that after step c), the upper shut-off valves are closed and the upper hydraulic cylinders are brought by the rotation of the rotating assembly into a lower position, in which the lower hydraulic cylinders are in an upper position and the shut-off valves of the hydraulic cylinders now in the upper position are opened; this step is then followed by the aforementioned steps. In particular, it is provided that the delineated steps are repeated cyclically, so that overall, a cyclically operating device is obtained.

A further aspect of the present invention relates to a method for implementing a rotating or rotatory system or machine preferably using the second solution, said method comprising the following steps:

Rotating the rotatable assembly clockwise or counter-clockwise around its horizontally mounted axis of rotation until the orientation of the weighted rod(s) is substantially such that a lower weight is immersed in a basin filled with liquid and experiences a buoyancy force such that the weight is moved upward against the force of gravity; Continuing rotation of the assembly until the lower weight in its 6 o'clock position has been transported to its upper retracted position; Moving the weighted rod downward by virtue of gravitational force to convey the hydraulic fluid from a first chamber at the lower coupled hydraulic cylinder to at least one (preferably two) chamber(s) of the hydraulic cylinder; Actuating the hydraulic fluid of the hydraulic cylinder currently located in the upper position from its first chamber into at least one (preferably two) chamber(s) of the hydraulic cylinder, thereby conveying the upper weight upward.

In a further alternative embodiment of the invention, in place of the hydraulic coupling of the weights and the weighted rod a mechanical coupling (e.g., via a corresponding cable pulley system) is implemented. For this purpose, the weights are preferably guided via such a cable pulley system over deflection rollers in such a way that the kinematics described above are implemented via a mechanical system rather than via hydraulics. Otherwise, however, the assembly design is the same as in the idea described above.

Additional advantageous embodiments of the invention are set out in the dependent claims. The invention will be explained in greater detail below in reference to an exemplary embodiment; the figures show the following:

FIGS. 1 to 3 relate to the first solution.

FIGS. 4 and 5 relate to the second solution.

The invention will be explained in greater detail below based on a first exemplary embodiment with reference to FIGS. 1 to 3; the same reference signs are used to denote the same functional and/or structural features.

Later, in reference to FIGS. 4 to 5, the invention will be explained in greater detail based on another exemplary embodiment having differently embodied cylinders, in which the force of buoyancy is used.

Figure 1:
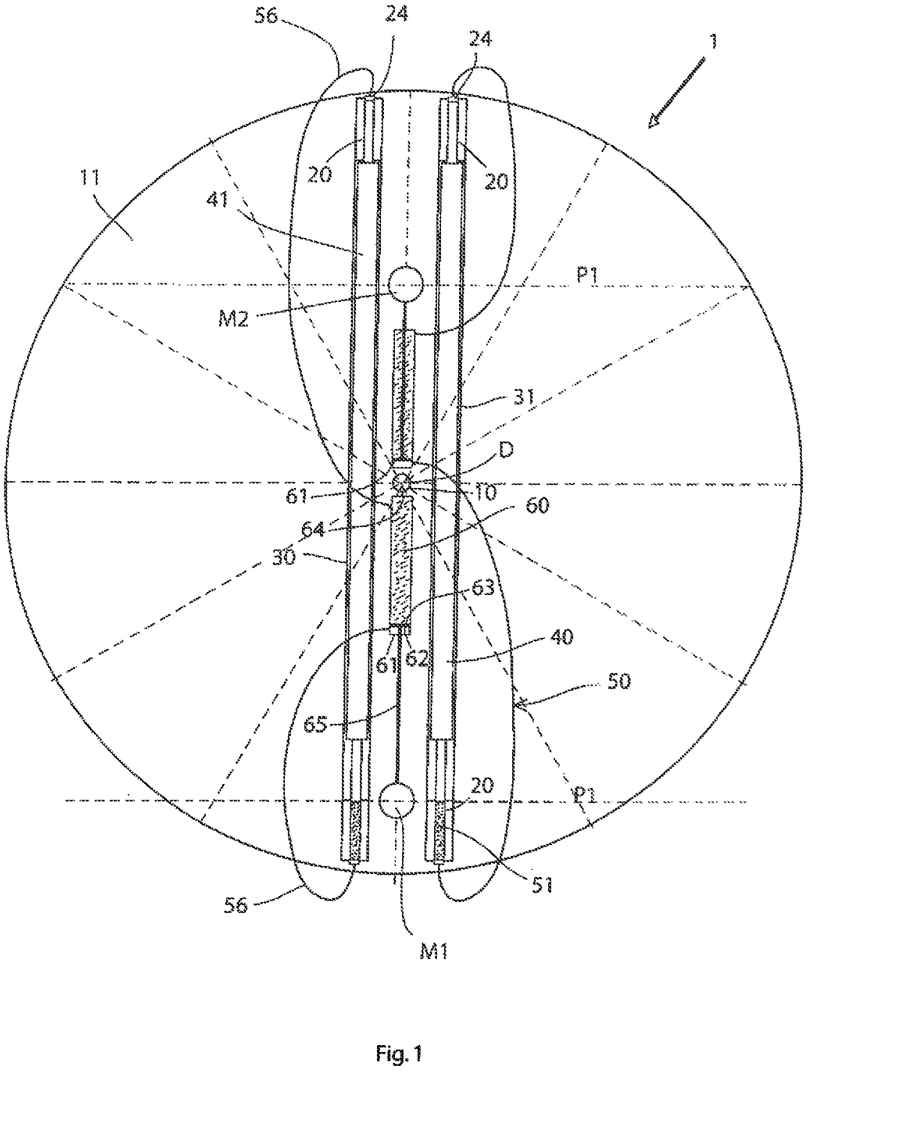
FIG. 1 shows a schematic view of an exemplary embodiment of a gravity hydraulic device.
Figure 2:
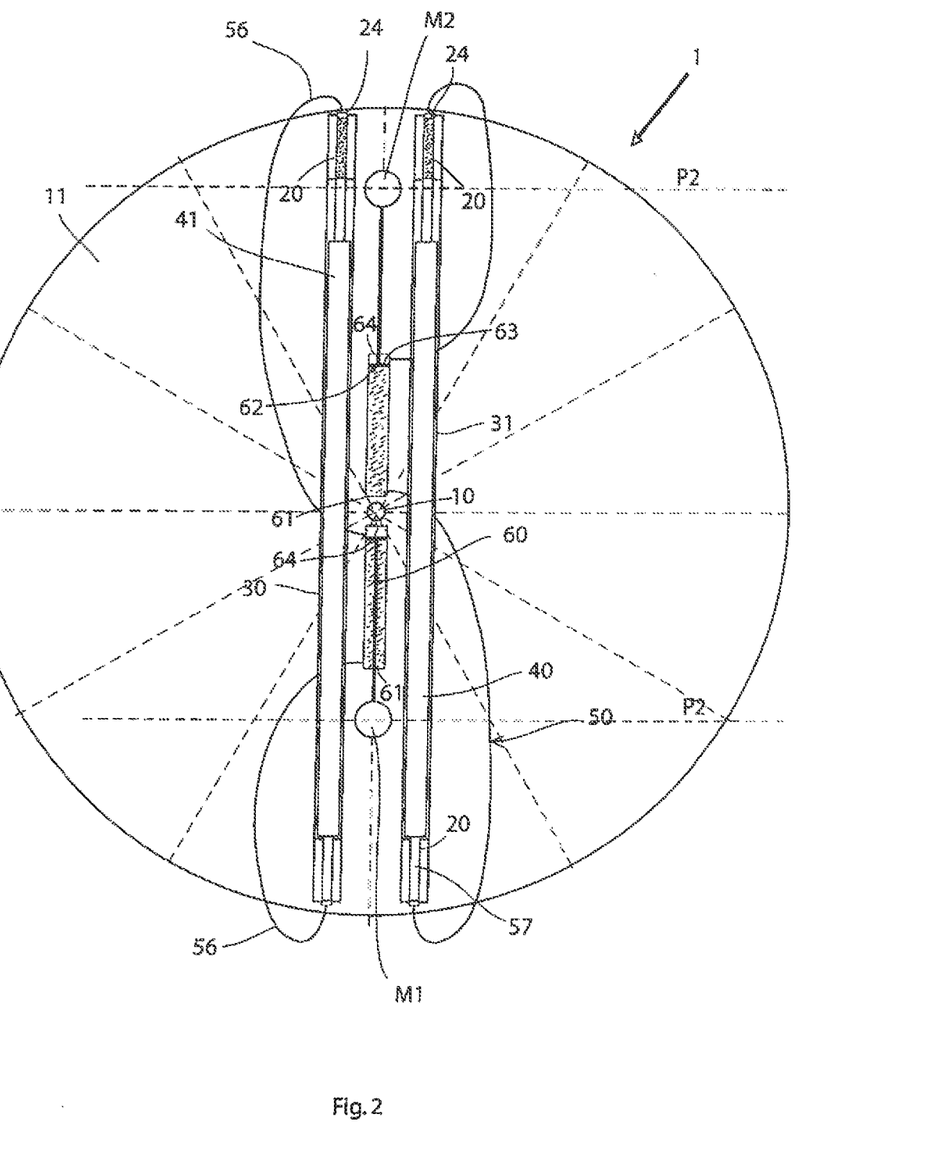
FIG. 2 shows a view similar to that of FIG. 1, but in a different process stage.

FIGS. 1 and 2 show different process times of a gravity-hydraulic device 1 that uses the gravitational force acting on the movably arranged masses M1, M2 as a source of energy.

The gravity-hydraulic device 1 depicted in FIG. 1 and FIG. 2 comprises an assembly 11 mounted such that it can rotate 360° around an axis of rotation D. For this purpose, a scaffold-like frame is provided, for example, the height of which must be at least half the height of the casing pipe 30, 31 used in the hydraulic system, which will be described in greater detail below, and in which all forces and loads can be absorbed by the frame.

At the upper end of said frame there can be a bearing block having a bearing and a shaft, which must likewise absorb all the forces that occur and can conduct these forces into the frame.

The aforementioned rotatably mounted assembly 11 is mounted rotatably on a shaft and can be a disk or similar structure, for example, to which the components of said gravity-hydraulic system are attached. In the present exemplary embodiment, two casing pipes 30, 31 are provided on the rotatably mounted assembly 11, mounted centrally with respect to the center of rotation on the rotatably mounted assembly 11. For this purpose, the two casing pipes can be mounted on the axially mounted disk. At the respective ends of the casing pipes 30, 31, hydraulic cylinders 20 are provided, and the base of the cylinder in each case defines the end of the overall length of the respective casing pipe 30, 31. Said hydraulic cylinders are arranged, so to speak, as an extension of the casing pipes.

Positioned inside each of these casing pipes is a weighted rod 40, 41, which is mounted to move back and forth in the radial direction R within one of the casing pipes 30, 31. Each weighted rod 40, 41 is connected at each of its ends to a cylinder piston 21 of one of the hydraulic cylinders 20 in a manner that will effect movement. In each case, the weighted rod is attached fittingly to the hydraulic cylinder on the casing pipe. The length of a casing pipe 30, 31 with an attached hydraulic cylinder 20 is equal to the length of the respective weighted rod 40, 41 and the hydraulic piston 20 minus one stroke length of the system.

In addition, in a closed flow system, a hydraulic fluid 51 is conveyed via connecting lines 56 of the flow system 50 in each case from the hydraulic cylinder 20 arranged at one end of a casing pipe 30, 31 to the hydraulic cylinder 20 arranged at the other, opposite end of said casing pipe, specifically by actuating the hydraulic cylinders 20 by the cylinder stroke L by means of the gravitational force acting on the weighted rods 40, 41. In the present exemplary embodiment, the weighted rods 40, 41 are mounted in liquid inside the casing pipes 30, 31. This has the advantage of significantly reducing the friction between the inside of the casing pipe 30, 31 and the respective weighted rod 40, 41, while at the same time allowing pressure to build up on the corresponding hydraulic piston, according to the hydrostatic paradox. Alternatively, rather than being mounted in a liquid, a mechanical bearing system or guide system, such as a sliding bearing or the like may be provided, by means of which the weighted rods 40, 41 are mounted to move back and forth inside the casing pipes 30, 31.

As is clear from FIGS. 1 and 2, each respective lower hydraulic cylinder 20 is connected via a connecting line 56 to a double-acting hydraulic cylinder 60. The second chamber of each double-acting hydraulic cylinder 60 is connected to the hydraulic cylinder 20 at the opposite end of the weighted rod 40, 41.

The space between one cylinder base 61 of the double-acting hydraulic cylinder 60 and one operative piston surface 62 of the piston 65 is fluidically connected to the lower hydraulic cylinder, while the space between the opposite, second cylinder base 64 of the double-acting hydraulic cylinder 60 and the second operative piston surface 63 is fluidically connected to the other hydraulic cylinder 20, specifically to the hydraulic cylinder at the upper end of the weighted rod 40, 41.

The method according to the invention can be explained by the two positions shown in FIGS. 1 and 2. In the orientation shown in FIG. 1, the weighted rods 40, 41 are in a substantially vertical position, the lower hydraulic cylinders 20 are in approximately the 6 o'clock position, and the upper hydraulic cylinders 20 are in approximately the 12 o'clock position. On the lower and upper hydraulic cylinders 20, shut-off valves 24 are provided for either opening or closing the connection between the double-acting hydraulic 1S cylinder 60 and the respective hydraulic cylinder 20. In FIG. 1, the shut-off valves 24 of the upper hydraulic cylinders 20 are open and the shut-off valves of the lower hydraulic cylinders 20 are closed. The shut-off valves 24 of the lower hydraulic cylinders 20 are then opened at a defined rotational position, in the case of clockwise rotation possibly between the 5 o'clock position and the 6 o'clock position, for example, wherein the gravitational force acting on the respective weighted rods 40, 41 forces the hydraulic fluid 51 in each of the lower hydraulic cylinders 20 through the connecting line 56 and into the respective lower piston chamber of the double-acting hydraulic cylinder 60. This causes the respective piston 65 of the respective double-acting hydraulic cylinder 60, together with the mass M1, M2 coupled thereto, to be actuated from a lower position P1 by the stroke length of the respective double-acting hydraulic cylinder 60 into an upper position P2.

It should be noted that the figures are merely schematic representations designed to illustrate the invention. In practice, the effective operative piston surface on each side of the piston 65 in conjunction with the effective piston volume of the double-acting hydraulic cylinder 60 above and below the respective piston surface 62, 63 is designed such that the product of inflowing hydraulic fluid (volume flow) and operative cylinder area of the piston is the same in both piston volumes of the double-acting hydraulic cylinder and is not reduced on one side, e.g. by a piston rod.

If a connection to the respective mass M1, M2 is implemented by means of a piston rod, a piston rod of the same type would likewise have to be provided on the opposite side of the piston, so that identical conditions are established on the two sides.

When the piston 65 is actuated, the hydraulic fluid 51 in the upper piston chamber of the double-acting hydraulic cylinder 60 is simultaneously conveyed via a connecting line 56 into the upper hydraulic cylinder 20 connected thereto.

This means that the weighted rods 40, 41 are now in their lower positions, while the masses M1, M2 are in their respective upper positions P2, as depicted in FIG. 2. Thereafter, the upper shut-off valves 24 are closed and the system can rotate into the diametrically opposite vertical position, in which the previously upper hydraulic cylinders 20 are now in the lower position and the previously lower hydraulic cylinders 20 are in the upper position. This cycle can thus be repeated with predetermined timing.

The double-acting hydraulic cylinders therefore have the following functions:
  to move the masses M1, M2 upward by means of the incoming compressed hydraulic fluid,
  and further, to convey the hydraulic fluid from the unpressurized cylinder halves into the hydraulic cylinders, which are constantly emptying at the top.

The configuration of the device as a whole, in particular the coordination of the stroke lengths of the cylinders and the stroke lengths of the double-acting hydraulic cylinders, the weights of the weighted rods 40, 41 and the masses M1, M2, and the specific configuration of the hydraulic system and the hydraulic cylinders 20, 60, is designed based upon the desired topology of the system. Here, it is necessary only to ensure that the above-described functions according to the invention are implemented, and in particular that the weights of the weighted rods, for example, and the hydraulic friction losses occurring in the system are dimensioned such that the weighted rods will nevertheless actuate the double-acting hydraulic cylinders upward, together with the masses M1, M2 arranged thereon.

The masses are therefore designed according to the capability of the hydraulic system (the weights of the weighted rods and the stroke height of the cylinders, along with the lifting height of the desired weights).

Figure 3:
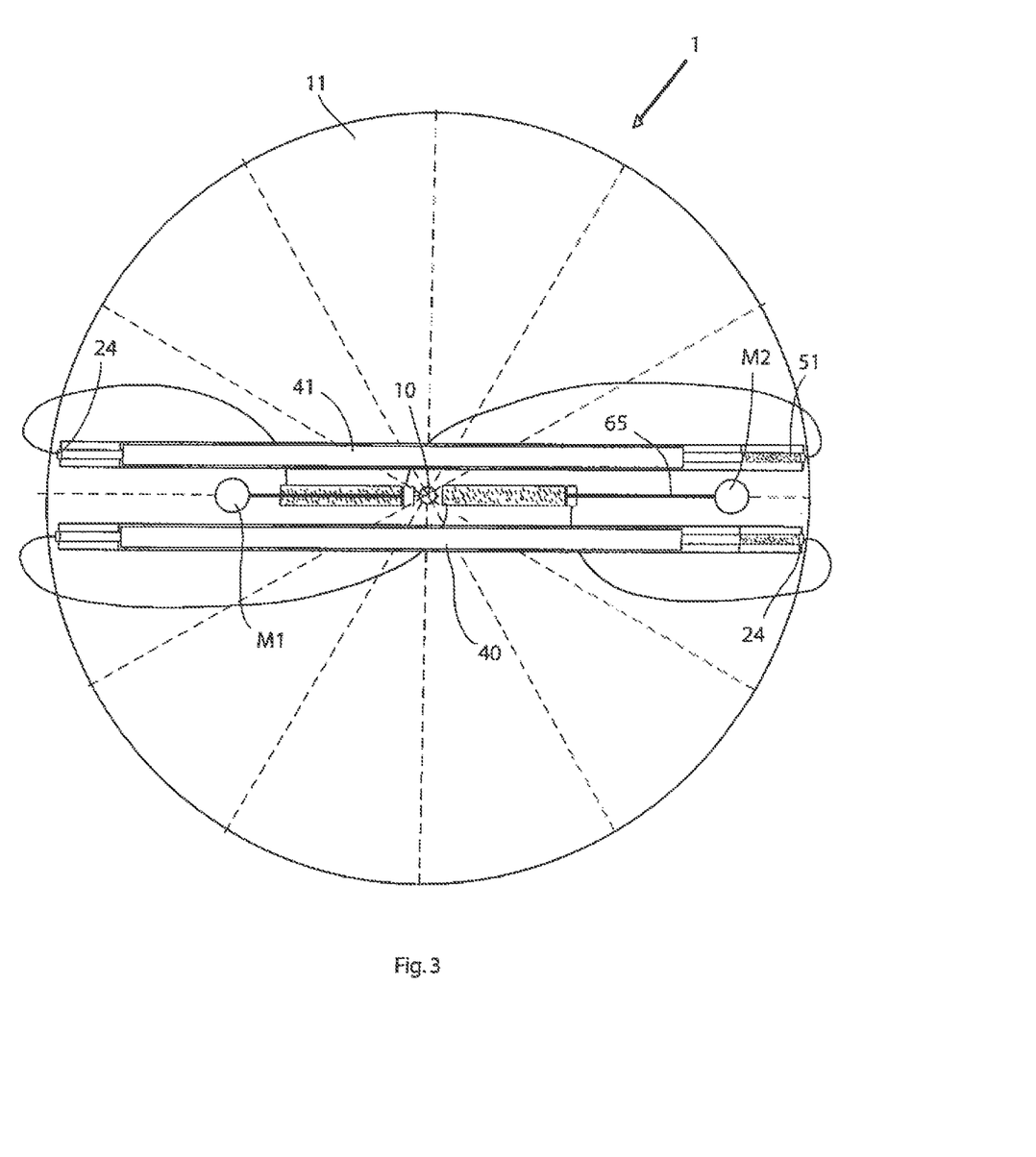
FIG. 3 shows a view similar to that of FIGS. 1 and 2 in a rotated process step.

FIG. 3 shows the position in which the device 11 has rotated clockwise by 90°.

When the system is rotated clockwise around the axis of rotation D, the distance of the movable weights M1, M2 from the center of the bearing thus has a significant influence on smooth running, and therefore also on the imbalance between the left and right parts of the boom and thus the torque and/or the efficiency of the system. Since an asymmetry results in each case between the center point and the eccentric distances of the weighted rods and the masses M1, M2 from the center of rotation D, the desired torque and/or efficiency to be realized in the system is obtained based upon the precise design of the geometric and specific topology of the gravity-hydraulic system.

In the following explanatory section, the invention will be described in greater detail based on another exemplary embodiment in which the force of buoyancy is used, in reference to FIGS. 4 to 5.

For this purpose, a hydraulic device 1 that uses the forces of gravity and buoyancy is provided, which, expanding upon the aforementioned embodiment, also provides a pool (basin) B of liquid, so that as the weighted rod 40 is rotated around its axis of rotation D, it can be moved up and down. More than one weighted rod can also be provided, which then operate in a comparable manner.

The masses M1, M2 (weights) are located at the ends of the rod and are conveyed through the liquid F in the basin B during rotation, where they experience buoyancy. A resulting force and torque component is thus the sum of the gravitational force acting on the weighted rod 40 and the masses M1, M2 coupled thereto and the buoyancy force Fa, which exerts a force component counter to gravity when the mass M1, M2 attached to the weighted rod is immersed.

The remaining operating principle of the other components is similar to that of the first solution described above, which lacks the buoyancy component due to the absence of a liquid basin B. In this solution, a single central weighted rod 40 is mounted rotatably around an axis of rotation and in a vertical alignment can be moved up and down, from a lower position to an upper position and vice versa, by the stroke length of the cylinders 20.

Figure 5:
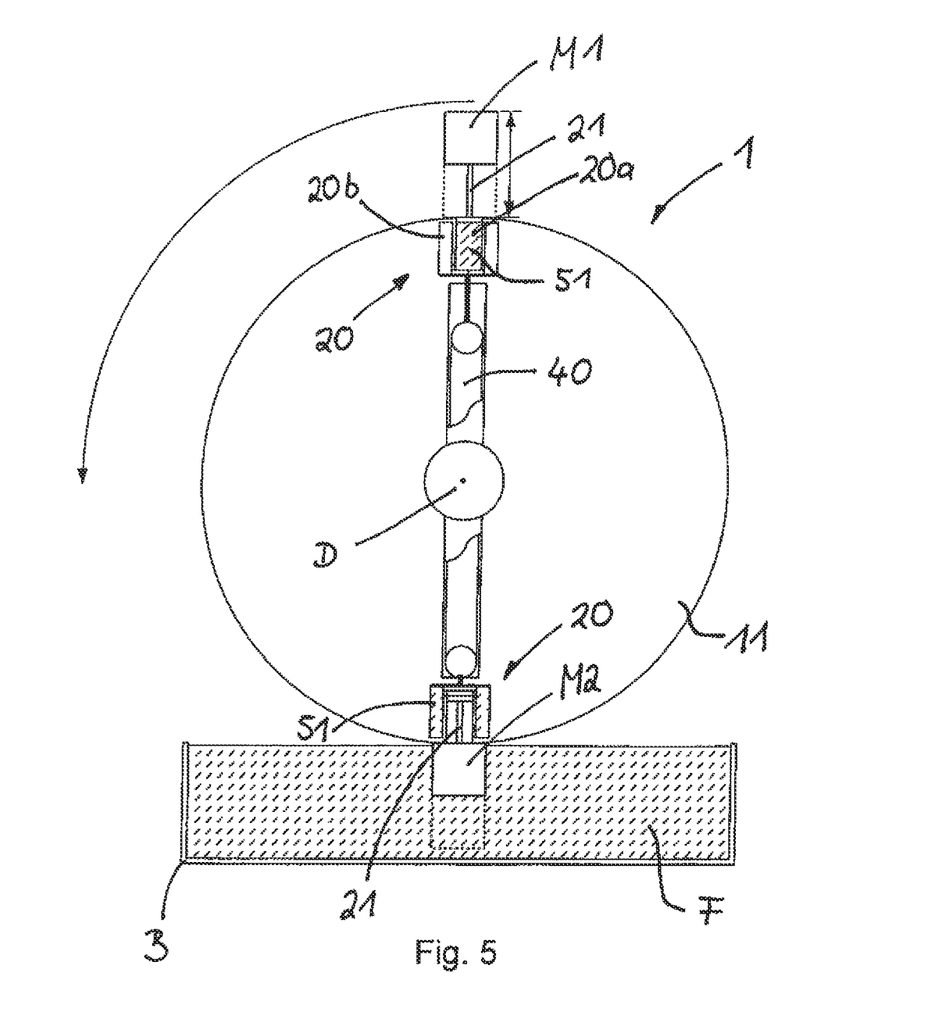

For this purpose, the weighted rod 40 is connected at each end to a double-acting hydraulic cylinder 20, as shown in FIG. 5, or two cylinders 20 acting together are used, one cylinder 20 being coupled to the mass M1 or M2 and the other cylinder 20 being coupled to the weighted rod 40.

In an alternate solution, the weighted rod presses the cylinder fluid of the cylinder 20a out into a second cylinder 20b, thereby lifting the mass M1.

Figure 4:
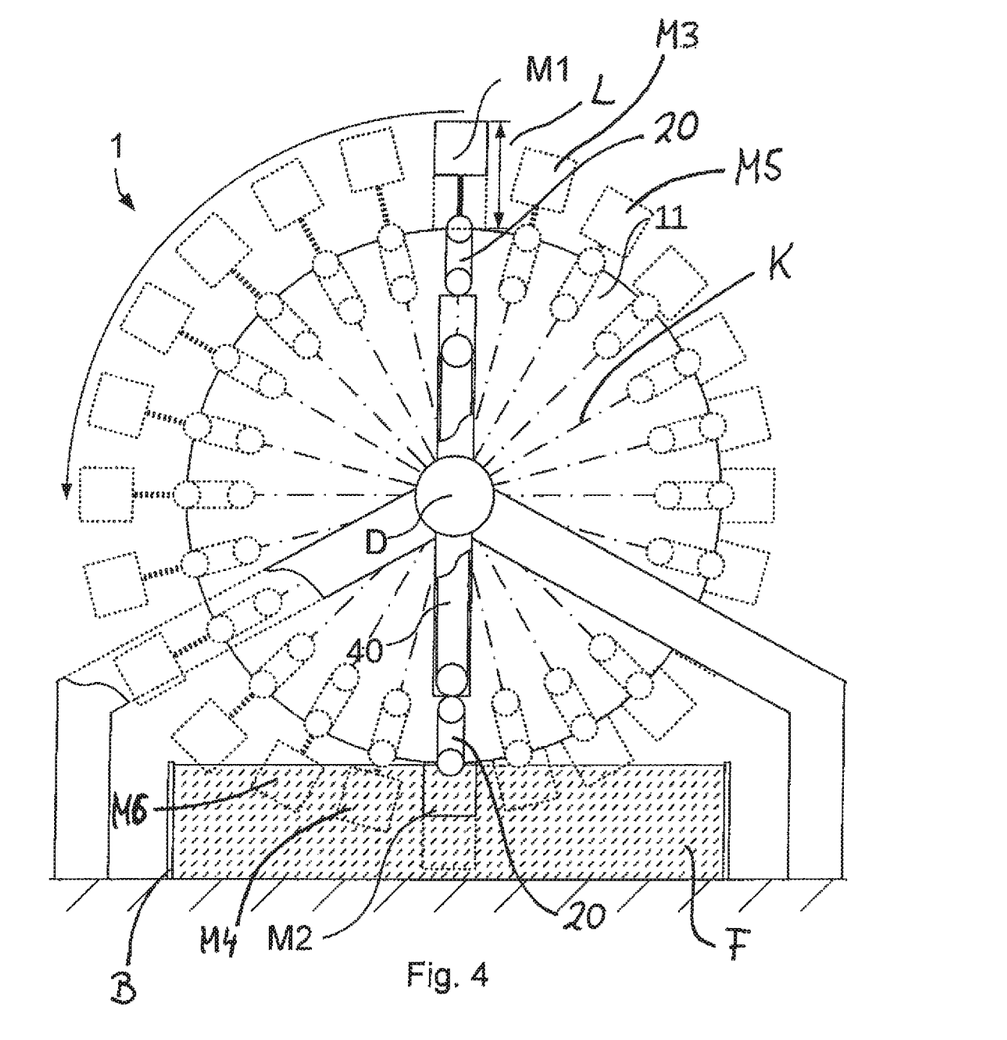
FIG. 4 shows a schematic view of an exemplary embodiment of a gravity- and buoyancy-hydraulic device and FIG. 5 shows an alternate configuration of the device according to FIG. 4.

In the embodiment depicted in FIG. 4, the weighted rod 40 is coupled to the cylinders 20 in such a way that the cylinder chambers 20a, 20b fill the one cylinder chamber 20a or the other cylinder chamber 20b with hydraulic fluid, depending on the current position of the masses M1, M2.

Since the two chambers 20a, 20b of the cylinders 20 are connected to one another hydraulically via a connecting line 50, the following cycle, described below based on a counterclockwise rotational movement, can be implemented.

The positions in FIGS. 4 and 5 are designated as the 12 o'clock position, the 3 o'clock and 9 o'clock positions, and the 6 o'clock position. In this embodiment, a total of 24 masses are arranged circumferentially at a certain distance from the axis of rotation D, as shown by way of example in FIG. 4.

The upper mass M1 in FIG. 4, which is in the 12 o'clock position at the beginning of the rotation, is in its maximum upper position, in which the weighted rod has been actuated to its lower position as a result of gravity.

FIG. 5 likewise depicts the weighted rod in its lower position, and illustrates the states of the hydraulic cylinders 20 in more detail. As is clear, the chambers 20b of the upper hydraulic cylinder 20 are not filled with hydraulic fluid, whereas the chamber 20a is filled. The mass M1 is in its upper position.

The mass M2 at the lower end of the weighted rod 40 is still in the liquid F in the basin B, but is also in its upper position. The filling of the chambers 20a, 20b is clear from FIG. 5.

When the upper extended weight M1 moves in the direction of the 6 o'clock position, the lower weight M2 simultaneously moves up to the 12 o'clock position. The weight moving in the direction of the 6 o'clock position reaches the basin B filled with liquid F at about the 7 o'clock position and remains moving through the liquid-filled basin until about the 5 o'clock position. During its movement in the basin B, the immersed mass M1, M2 experiences a buoyancy force Fa. The cylinders 20 coupled to the mass M1, M2 in this position are emptied by the buoyancy and the movement of the piston rod. The force ratios can be coordinated and dimensioned appropriately for this purpose.

When the mass M2, which previously was in the basin B, arrives in the upper, 12 o'clock position shown in FIG. 5, the weighted rod 40 moves downward again, thereby emptying the previously filled chambers 20b of the cylinder 20 and filling the cylinder 20 coupled to the weight M2. As a result, the weight is moved hydraulically upward.

The described cycle then repeats with each additional 180° rotation.

Each of said weights M1, M2 is connected or coupled to a cylinder piston 60 of one of the hydraulic cylinders 20 in a manner that will effect movement. In a closed flow system 50, a hydraulic fluid is further provided, which conveys the hydraulic fluid via connecting tubes (not shown) of the flow system 50, from one hydraulic cylinder 20, 20a, 20b to the other hydraulic cylinder 20, 20a, 20b at each end by actuating the hydraulic cylinders by the cylinder stroke. The radial displacement of the masses M1, M2 and the different torque ratios above and below result in an effective torque that is used in the direction of rotation.

The embodiment of the invention is not restricted to the preferred, specific embodiment examples described above. Rather, a number of variants are possible that make use of the described solution even in fundamentally different configurations. In particular, the number of weighted rods and the number of weights may be modified. Rather than a single weight M1, M2, it would be conceivable to attach one or more weights, even variable weights, to one of the double-acting hydraulic cylinders 60 in each case.

In a further alternative and preferred embodiment of the invention that utilizes the force of buoyancy as described further above, the following is provided. In this case again, reference will be made to the positions of a clock, specifically the 6 o'clock position, the 9 o'clock and 3 o'clock positions, and the 12 o'clock position. Generally, at equal angular distances, e.g. 12 or 24 weights are provided at diametrically opposite positions on the assembly, which is mounted such that it can rotate 360°.

When the upper extended weight M1 moves in the direction of the 6 o'clock position, the lower weight M2 simultaneously moves up to the 12 o'clock position, and so on. The weight moving in the direction of the 6 o'clock position reaches the basin B filled with liquid F at about the 7 o'clock position and remains moving through the liquid-filled basin until about the 5 o'clock position.

The conditions should be created such that the buoyancy force and thus the displaced volume of the lower weight M1 located in the 6 o'clock position (bottom) is equal at least to the weight force of the weight (M1) at the bottom and M2 (at the top in the 12 o'clock position), along with the friction and coupling forces in the system, so that it is possible for both the lower weight M1 and the upper weight M2 to be lifted. In FIG. 4, M1, . . . , Mn weights are shown by way of example, with n=24, wherein between every two diametrically opposite weights, e.g. between M1 and M2 or between M3 and M4 or between M5 and M6, etc., a coupling device K is arranged, which connects the weights to one another in a manner that will enable movement, so that when the lower weight that is located in the liquid basin B with the liquid F is raised, the upper diametrically opposite weight coupled to said weight is likewise raised. The physical conditions must be adjusted accordingly. The coupling device K for lifting the weights may be implemented via a hydraulic, mechanical, or hydromechanical coupling, or by some other coupling.

Since the distance of the raised, upper weight M2 in the 12 o'clock position (in the raised position as a result of buoyancy) from the center of rotation D is greater than the distance of the lower weight M1 (in the 6 o'clock position) from the center of rotation D, greater torque is generated at the top. As rotation of the system continues, this torque acts to drive the rotational movement.

This weight shift propagates from one weight to the next and effects a continuous lifting movement of each of the weights arriving at the 12 o'clock position, in each case by the buoyancy of the weight that is then diametrically opposite it in the lower basin, which in turn must generate by the buoyancy a buoyancy force that corresponds at least to the weight force of the two weights M1 and M2 along with the friction or coupling forces in the system or, in other words, twice the weight force+the forces to be overcome by internal system losses.

To compensate for the frictional forces or flow resistances that occur with the immersion of the weights in the liquid pool during the described rotation of the system, controllable magnets can be used to counteract or to fully compensate for these forces in conjunction with the weights. For this purpose, any measures suitable for minimizing or nearly eliminating such braking effects in the system may be provided The coupling between the respectively diametrically opposite weights, i.e., weights in the 6 o'clock and 12 o'clock positions, the 7 o'clock and 11 o'clock positions, the 8 o'clock and 10 o'clock positions, and so on, for raising the weights can be implemented via a hydraulic, mechanical, or hydromechanical coupling or via some other coupling, e.g., via cable systems or the like.

For this purpose, the force ratios and mechanical devices must be suitably coordinated and dimensioned for this purpose, so that the weights are raised according to the above-described system and the weight located at the top in each case generates a corresponding torque, as described above.

Thus, the concept of a gravity-hydraulic device that uses the gravitational force acting on movable masses M1 to Mn, which are provided on the gravity-hydraulic device, as a source of energy is realized in this embodiment, which is designed with a suitable coupling system between the weights and which completes a 360' rotation around the axis of rotation D, in that the masses, which are attached in variable positions, contribute torque to the rotational movement.

The method steps described above are carried out such that the delineated steps are repeated cyclically.

The invention claimed is:

1. A gravity-hydraulic device (1) that uses gravitational force acting on a plurality of movable masses (M1, M2, M3, Mn), which are coupled to the gravity hydraulic device (1) such that their positions are variable, as a source of energy, wherein the hydraulic device (1) comprises an assembly (11) mounted to rotate 360° around an axis of rotation (D), wherein two masses (M1, M2) in diametrically opposite regions of the assembly are respectively coupled to one another by means of a coupling device (K) such that movement in the radial direction (R) is enabled, so that a force acting on the coupling device counter to the gravitational force acting on the masses moves, raises, at least the masses (M1, M2) located diametrically opposite one another at the bottom and the top, in terms of their distance from the axis of rotation (D);

wherein the assembly (11) is mounted to rotate 360° around an axis of rotation (D), along with at least one weighted rod (40), which can be moved back and forth in the radial direction (R) and which is coupled hydraulically or mechanically at its ends to the masses (M1, M2) such that movement is enabled, and when the weighted rod (40) is displaced by gravity from an upper to a lower position, the masses (M1, M2) located at the bottom and at the top are displaced in terms of their distance from the axis of rotation (D) by virtue of the mechanical or hydraulic coupling;

wherein when the at least one weighted rod (40) is coupled at its ends to the masses (M1, M2) via at least one hydraulic cylinder (20) such that movement is enabled, a hydraulic fluid (51) in a closed flow system (50) is conveyed in each case via connecting lines (56) of the flow system (50) from a first cylinder chamber (20a) into a second cylinder chamber (20b) of the hydraulic cylinder(s) (20), at least when the weighted rod (40) is displaced from an upper to a lower position, thereby conveying the respective mass (M1, M2) that is positioned at the top; and wherein the gravity-hydraulic device (1) is configured as a gravity- and buoyancy-hydraulic device in which, during rotation of the assembly (11), one of the masses (M1, M2) is conveyed through a liquid, so that a buoyancy force is exerted on said mass (M1, M2).

2. The gravity-hydraulic device (1) according to claim 1, characterized in that the axis of rotation (D) is aligned substantially horizontally.

3. The gravity-hydraulic device (1) according to claim 1, characterized in that a plurality of weights spaced radially from the axis of rotation (D), wherein 24 weights having a fixed or movable radial distance from the axis of rotation (D), are arranged on the rotatable assembly (11).

4. The gravity-hydraulic device (1) according to claim 1, characterized in that the gravity-hydraulic device (1) is configured as a gravity- and buoyancy-hydraulic device, in which a basin (B) containing a liquid (F) is provided, through which the masses (M1, M2) are conveyed during a rotation of the assembly (11), so that a buoyancy force is exerted on the masses (M1, M2).

5. The gravity- and buoyancy-hydraulic device (1) according to claim 4, wherein the masses (M1, M2) are dimensioned such that the buoyancy force generated in the liquid (F) is sufficient to actuate the cylinder piston of the cylinder (20) coupled thereto.

6. The gravity-hydraulic device (1) according to claim 1, wherein at least one or two casing pipes (30, 31) is or are provided, mounted centered with respect to the center of rotation on the rotatably mounted assembly (11), with the ends of each being connected to a hydraulic cylinder (20), wherein a weighted rod (40, 41) is mounted to move back and forth in a radial direction (R) in each of the casing pipe(s) (30, 31) and is connected at each end to a cylinder piston (21) of one of the hydraulic cylinders (20) so as to enable movement, and a hydraulic fluid (51) in the closed flow system (50) is conveyed in each case via connecting lines (56) of the flow system (50) from the hydraulic cylinder (20) arranged at one end of the respective casing pipe (30, 31) to the hydraulic cylinder (20) arranged at the other, opposite end of the respective casing pipe (30, 31) as a result of the actuation of the hydraulic cylinder by the cylinder stroke (L) by means of the gravitational force acting on the weighted rods (40, 41).

7. The gravity-hydraulic device (1) according to claim 6, characterized in that the rotatably mounted assembly (11) is mounted to rotate around a horizontally arranged shaft (10)

and the radial mobility of the weighted rod (40, 41) corresponds to the stroke length (HL) of the hydraulic cylinder (20) connected thereto.

8. The gravity-hydraulic device (1) according to claim 6, characterized in that the hydraulic cylinder (20) arranged at one end of a casing pipe (30, 31) is fluidically connected via a double-acting hydraulic cylinder (60) to the hydraulic cylinder (20) arranged at the other, opposite end of said casing pipe (30, 31), wherein the space between the one cylinder base (61) of the double-acting hydraulic cylinder (60) and the one operative piston surface (62) of a piston (65) is fluidically connected to the one hydraulic cylinder (20), while the space between the second, opposite cylinder base (64) of the double-acting hydraulic cylinder (60) and the second operative piston surface (63) is fluidically connected to the other hydraulic cylinder (20).

9. The gravity-hydraulic device (1) according to claim 8, characterized in that each of the connecting lines (56) that connect the hydraulic cylinders (20) to the double-acting hydraulic cylinders (60) can be opened and closed via shut-off valves (24) at a certain time, in particular in a certain cycle.

10. The gravity-hydraulic device (1) according to claim 6, characterized in that a controller is also provided, which can actuate as intended, in particular can open or close, at least one shut-off valve or a group of the shut-off valves (24) of the hydraulic cylinders (20) mounted on the one side of the casing pipes, while at the same time the controller can actuate, in particular can open or close, at least one shut-off valve (24) or a group of shut-off valves (24) of the hydraulic cylinders on the opposite side of the casing pipes, depending on the relative position and/or angular position and/or rotational speed of the rotatably mounted assembly (11).

11. The gravity-hydraulic device (1) according to claim 8, characterized in that the piston (65) of each double-acting cylinder (60) is coupled to one of the arranged respective masses (M1, M2) in such a way that when the piston (65) is actuated, the respective masses (M1, M2) can be actuated from a lower position to an upper position.

\* \* \* \* \*